United States Patent [19]
Zauner

[11] Patent Number: 5,156,287
[45] Date of Patent: Oct. 20, 1992

[54] GANGABLE ELECTRICAL OUTLET BOX

[75] Inventor: Herman Zauner, Mont St-Hilaire, Canada

[73] Assignee: Westinghouse Electric Corp., Pittsburgh, Pa.

[21] Appl. No.: 756,740

[22] Filed: Sep. 9, 1991

[51] Int. Cl.$^5$ .............................................. H02G 3/08
[52] U.S. Cl. .................................. 220/3.94; 220/4.02
[58] Field of Search ........................ 220/3.2, 3.7, 3.94, 220/4.02, 4.33, 4.34, 4.28

[56] References Cited

U.S. PATENT DOCUMENTS

| | | | |
|---|---|---|---|
| 1,249,313 | 12/1917 | Boyton et al. | 220/3.94 |
| 1,369,083 | 2/1921 | Clayton | 220/3.94 |
| 1,672,263 | 6/1928 | Kruse | 220/3.94 |
| 2,028,509 | 1/1936 | Knell | 220/3.94 |
| 4,176,759 | 12/1979 | Nattel | 220/3.94 |
| 4,263,472 | 4/1981 | Maheu | 220/3.94 |

FOREIGN PATENT DOCUMENTS 1071746  2/1980  Canada .

*Primary Examiner*—Joseph Man-Fu Moy
*Attorney, Agent, or Firm*—M. J. Moran

[57] ABSTRACT

A side plate for use in a knockdown, electric wiring box to form a side wall of the wiring box. The side plate includes a retaining member at a first extremity of the side plate for engagement by interpenetration with a mating component on the electric wiring box to form a releasable interlock retaining the first extremity to the electric wiring box. A screw stop, projecting from the side plate in a direction opposite the electric wiring box is provided at a second extremity of the side plate to form a positive and firm abutment for a locking screw threadedly engaged in the electric wiring box, overlapping the side plate to achieve an interference relationship therewith and lock the second extremity of the side plate to the electric wiring box. The invention is also directed toward an electric wiring box incorporating the novel side plate.

14 Claims, 3 Drawing Sheets

GANGABLE ELECTRICAL OUTLET BOX

FIELD OF THE INVENTION

The invention relates to the art of manufacturing electrical wiring enclosures, more particularly to a side plate for use in knockdown, electric wiring boxes, provided with a stop screw to form a positive and firm abutment for the screw holding the side plate in a locked condition on the electric wiring box. The invention also extends to a metallic, sectional or gangable type electric wiring box incorporating the novel side plate.

BACKGROUND OF THE INVENTION

Gangable, electric wiring boxes are widely used in domestic or industrial wiring installations. A typical gangable, electric wiring box as described for example in Canadian patents 1,071,746 and 1,083,701, and in U.S. Pat. Nos. 4,165,010 and 4,176,759, comprises a unitary U-shaped strip of sheet metal constituting the top, bottom and rear walls of the electric wiring box, and side plates removably attached to the U-shaped strip for closing its opened sides and form the side walls of the electric wiring box. The modular structure of the wiring box allows to assemble on site a wiring enclosure having the desired dimensions.

The mechanical arrangement for retaining the side plate to the U-shaped strip includes a pair of interengaging mating members forming a releasable interlock at one end of the side plate and at the opposite end, a locking screw threaded on the U-shaped strip, overlapping the side plate to achieve an interference relationship therewith, urging the side plate in intimate contact with the U-shaped strip. The locking screw engages a slanted recessed surface on the side plate, constituting an abutment for the screw and having the capability to compensate for manufacturing tolerances by providing an extended screw engaging area.

In practise, it has been found difficult to keep the dimensional relationship between the slanted surface and the length of the locking screw to the needed tolerances, resulting in a loose assembly between the side wall and the U-shaped strip when the tip of the locking screw fails to create a sufficient amount of pressure on the slanted surface. As a result, the electrical wiring box may fall apart when subjected to a strong mechanical impact, such as when it is hit with a hammer to drive fasteners for attaching the wiring box to a stud of a hollow wall structure.

An additional difficulty may develop when the installer will attempt to compensate for the insufficient screw length by driving the locking screw further until the screw head rests on the U-shaped strip. The screws which are currently used to assemble electric wiring boxes are not threaded completely up to the head. When such a screw is driven completely through the threaded hole, the screw thread in the U-shaped strip is likely to be damaged.

The problem of a loose assembly or striped threads may be solved by providing a longer screw. However, considering that the tip of the screw meets the slanted surface at an incidence angle deviating substantially from 90°, a camming effect is created and as a result the slanted surface cannot provide a positive and firm abutment for the locking screw. Accordingly, it is difficult to sense precisely by the amount of torque applied on the screwdriver the point at which the locking screw creates a sufficient amount of locking pressure on the slanted surface. The reduced feedback requires a considerable amount of dexterity and experience to determine the critical screw tightening point, which if exceeded, will cause a distortion of the side plate.

OBJECTS AND STATEMENT OF THE INVENTION

An object of the invention is a side plate for a knockdown, electric wiring box providing a positive and firm abutment for a locking screw, whereby permitting a longer locking screw to be used for reducing the need for tight tolerance requirements.

Another object of the invention is a knockdown, electric wiring box with a side plate providing a positive and firm abutment for a locking screw, whereby allowing a longer locking screw to be used without the need for tight tolerance requirements.

The invention provides a side plate for attachment to a generally U-shaped strip to form a side wall of a knockdown, electric wiring box, the side plate comprising:

a retaining member adjacent a first extremity of the side plate for engagement by interpenetration with a mating component on the U-shaped strip to form a releasable interlock retaining the first extremity of the side plate to the U-shaped strip; and a screw stop adjacent a second extremity of the side plate opposite the first extremity, the screw stop projecting from a main surface of the side plate opposite the U-shaped strip, the screw stop forming a positive and firm abutment for a locking screw threadedly engaged in the U-shaped strip, overlapping the side plate to achieve a condition of interference relationship therewith for locking the second extremity to the U-shaped strip.

In a preferred embodiment, the side plate has a generally rectangular configuration and it is made from sheet metal by a die cutting process. The screw stop is formed by a punching operation to provide a projecting member with a base flush with the side plate and a screw engaging tip terminating with a surface which is generally perpendicular to the plane of the side plate. As a result, the surface is in parallel relationship with the tip of the screw. This arrangement provides a firm abutment for a locking screw which does not give rise to a camming effect that may cause the side plate to bow or to be otherwise distorted when the screw is tightened against the stop. Accordingly, a longer screw may be safely used, therefore allowing the manufacturing tolerances to be relaxed.

The invention also provides a knockdown, electric wiring box, comprising:

a U-shaped strip forming top, bottom and back walls of the electric wiring box;

two side plates releasably mounted to the U-shaped strip for closing respective open sides thereof and form side walls of the electric wiring box;

a releasable interlock between each side plate and the U-shaped strip for retaining a first end of each side plate to the U-shaped strip;

a pair of opposite tabs on the U-shaped strip, adjacent to respective second ends of the side plates, each tab threadedly receiving a locking screw overlapping a respective side plate to achieve a condition of interference relationship therewith for locking the second end of the side plate to the U-shaped strip;

a screw stop projecting from each side plate away from the U-shaped strip, the screw stop being adjacent a respective tab and forming a positive and firm abutment for the locking screw in the tab.

DESCRIPTION OF A PREFERRED EMBODIMENT

Figure 2:
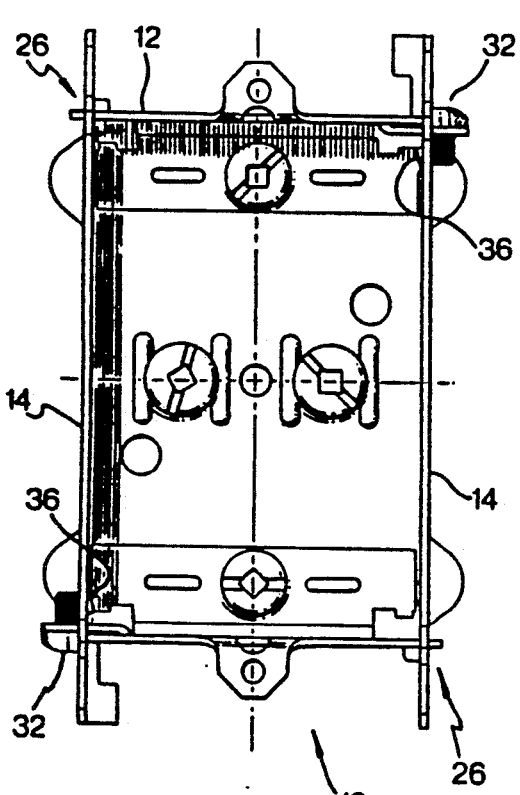
FIG. 2 is a front elevational view of the knockdown, electric wiring box of FIG. 1.
Figure 1:
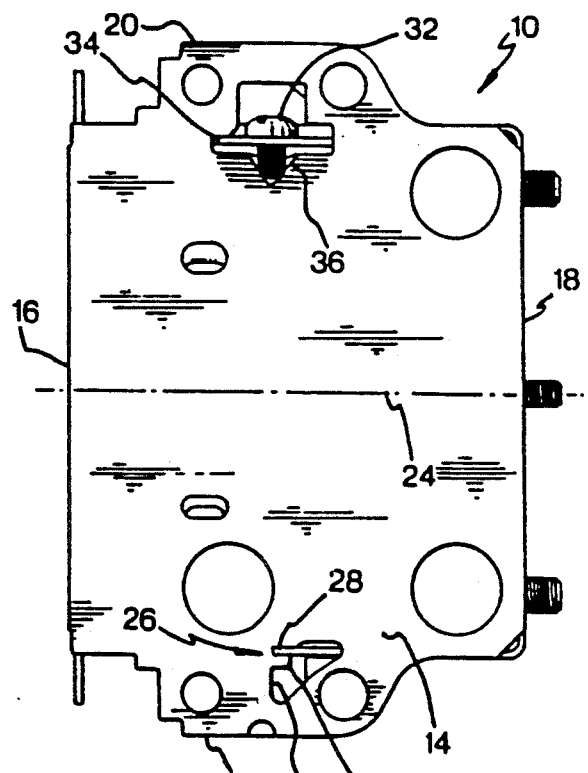
FIG. 1 is a side elevational view of a prior art knockdown, electric wiring box.

Referring to FIGS. 1 and 2, a prior art knockdown, electric wiring box is identified comprehensively by the reference numeral 10. The wiring box 10 comprises a unitary U-shaped strip of sheet metal forming the top, bottom and rear walls of the wiring box 10. The open sides of the U-shaped strip 12 are closed with side plates 14 constituting the side walls of the wiring box 10. Each side plate 14 comprises front and rear parallel edges 16 and 18 and top and bottom end edges 20 and 22 which are symmetrical about a transversely extending imaginary dividing line 24.

Each side plate 14 is retained to the U-shaped strip 12 at its edge 22 by a releasable interlock 26 comprising a pair of interpenetrating components, namely a locking finger 28 projecting from the U-shaped strip 12, received in an aperture 30 defining a locking tooth 31 engaging the finger 28 when the interlock is in a locked condition.

The operation of the interlock 26 is generally known to those skilled in the art and it will not be described in detail. Suffice it to say that the interlock is responsive to a pivotal movement of the side plate 14 with respect to the U-shaped strip 12; rotating the side plate 14 in the clockwise direction from the position shown in FIG. 1 will produce a disengagement of the interlock, permitting the separation of the extremity 22 from the U-shaped strip 12.

The extremity 20 of the side plate 14 is retained by a screw 32 threadedly engaged in a tab 34 projecting through an aperture in the side plate 14 and being perpendicular thereto. The screw 32 overlaps the side plate 14 achieving a condition of interference relationship therewith. The screw 32 presses against a slanted recessed surface 36 to urge the side plate 14 against the U-shaped strip 12. This particular locking arrangement is unsatisfactory for the reasons expressed in the introductory portion of the specification.

Figure 3:
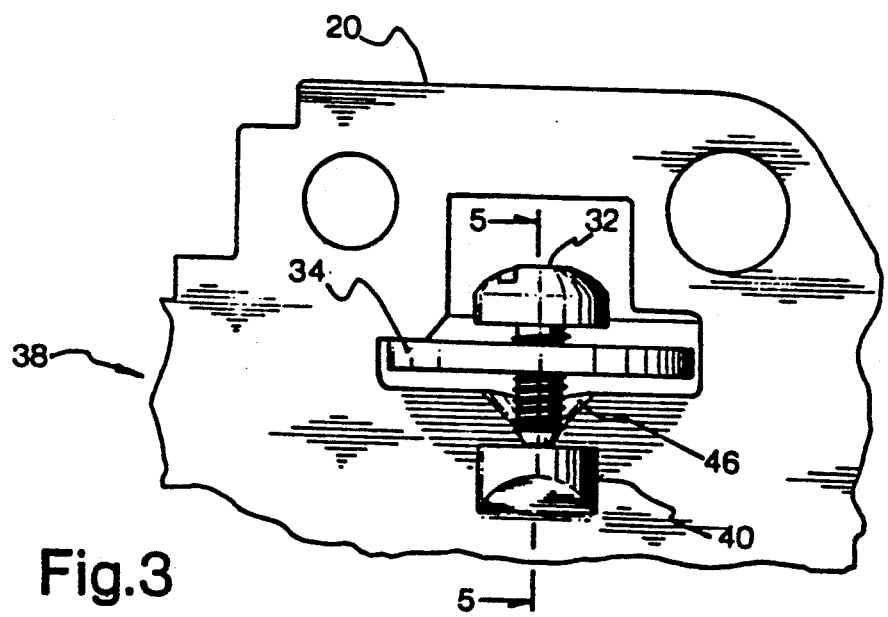
FIG. 3 is an elevational fragmentary view of a side plate constructed in accordance with the present invention, shown attached to a U-shaped strip of a knockdown, electric wiring box.

FIG. 3 illustrates a novel side plate embodying the concept of the present invention, designated comprehensively by the reference numeral 38. The side plate 38 comprises a screw stop 40 projecting from the plane of the side plate in a direction opposite the U-shaped strip 12.

Figure 4:
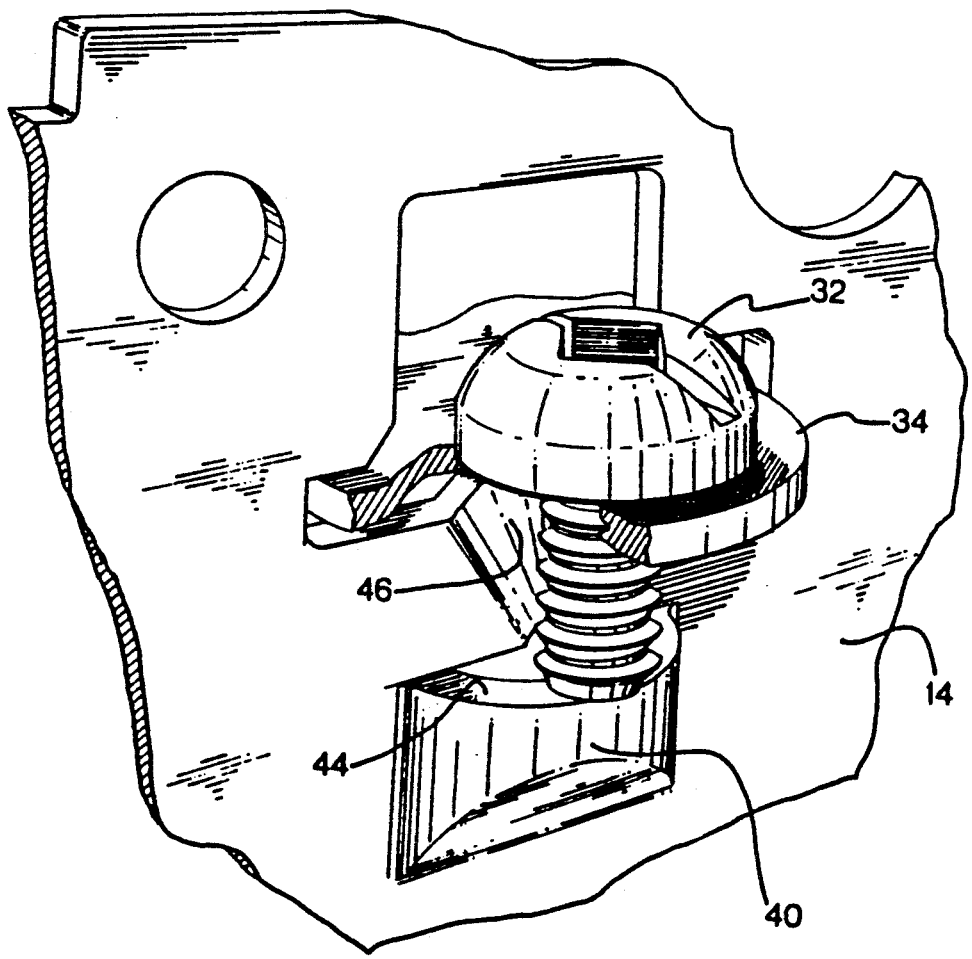
FIG. 4 is a highly enlarged fragmentary perspective view of the side plate shown in FIG. 3.
Figure 7:
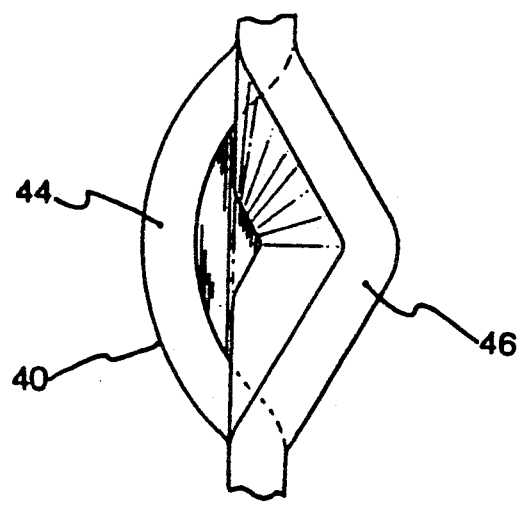
FIG. 7 is a sectional view along lines 7—7 in FIG. 4.
Figure 6:
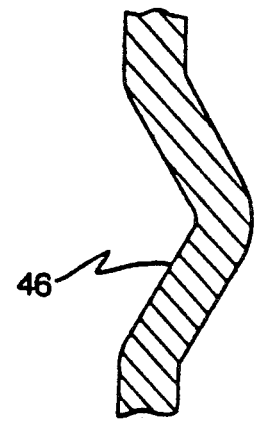
FIG. 6 is an enlarged sectional view along lines 6—6 in FIG. 4.
Figure 5:
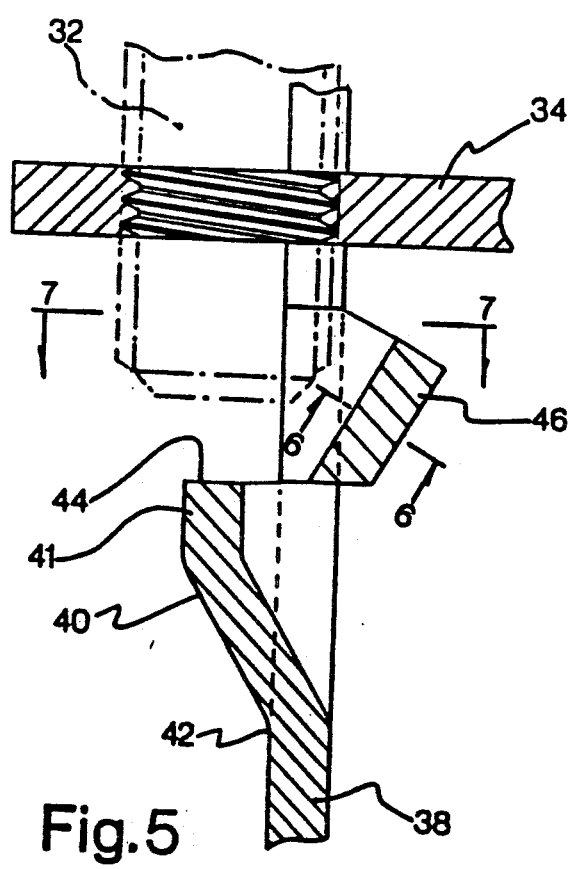
FIG. 5 is an enlarged sectional view along lines 5—5 in FIG. 3.

As best illustrated in FIGS. 4, 5 and 6, the stop 40 has a generally arcuate projecting member 41 having a base portion 42 merging and being flush with the side plate 38 and a projecting tip 44 perpendicular to the plane of the side plate 38 and being in a parallel relationship with the tip of the screw 32 shown in dashed lines in FIG. 4.

Immediately above the projecting member 41 a shallow V-shaped recess 46 is provided allowing the shank of the screw 32 to be threaded without any interference with the side plate 38 until it abuts against the projecting tip 44 of the projecting member 41. The projecting member 41 and the recess 46 are formed into a single stamping operation which resides in providing a cut in the sheet metal of the side plate 38 to part the projecting member 41 from the recess 46 and simultaneously stretching locally the metallic material in opposite directions.

By virtue of the parallel relationship between the tip 44 and the tip of the screw 32, the action/reaction forces developping when the screw engages the projecting member 41 will be generally parallel to the plane of the side plate 38, virtually precluding any camming action exerted on the side plate by the locking screw. The firm and positive abutment provided by the projecting member 41 provides a strong and direct feedback permitting the installer to easily sense when the locking screw 32 is in intimate contact with the projecting member 41.

The side plate and the other components of the electrical box may be made from non-metallic material for use in specific applications such as in a highly corrosive environment whose corrosion resistance is an important factor.

The above description of preferred embodiments of the invention should not be interpreted in any limiting manner because they may be refined and varied without departing from the spirit of the invention.

The embodiments of the invention in which an exclusive property of privilege is claimed are defined as follows:

1. A side plate for attachment to a generally U-shaped strip to form a side wall of a knockdown, electric wiring box, said side plate comprising:

a retaining member adjacent a first extremity of said side plate for engagement by interpenetration with a mating component on the U-shaped strip to form a releasable interlock retaining said first extremity to the U-shaped strip; and a screw stop adjacent a second extremity of said side plate opposite to said first extremity, said screw stop projecting from a main surface of said side plate opposite the U-shaped strip, said screw stop having an abutment surface which is generally perpendicular to the path of travel of a locking screw threadedly engaged in the U-shaped strip for overlapping said side plate to achieve a condition of interference relationship therewith in order to lock said second extremity to the U-shaped body.

2. A side plate as defined in claim 1, wherein said stop screw constitutes means to withstand thrust from the locking screw by generating a resultant reaction force on the locking screw which is generally parallel to an imaginary plane containing said side plate.

3. A side plate as defined in claim 2, wherein said screw stop comprises a projecting member with a tip and a base flush with said side plate.

4. A side plate as defined in claim 3, wherein said tip comprises a screw engaging surface generally perpendicular to said imaginary plane.

5. A side plate as defined in claim 1, comprising an elongated recess adjacent said screw stop for receiving the locking screw.

6. A side plate as defined in claim 1, wherein said side plate is made of material selected from the group consisting of metallic material and non-metallic material.

7. A side plate as defined in claim 1, wherein said side plate is generally rectangular.

8. A knockdown, electric wiring box, comprising:
- a U-shaped strip forming top, bottom and back walls of said electric wiring box;
- two side plates releasably mounted to said U-shaped strip for closing respective open sides thereof and form side walls of said electric wiring box;
- a releasable interlock between each side plate and said U-shaped strip for retaining a first end of each side plate to said U-shaped strip;
- a pair of opposite tabs on said U-shaped strip, adjacent to respective second ends of said side plates, each tab threadedly receiving a locking screw overlapping a respective side plate to achieve a condition of interference relationship therewith, locking the second end of the side plate to said U-shaped strip; and
- a screw stop projecting from each side plate away from said U-shaped strip, said screw stop being adjacent to a respective tab and forming a positive and firm abutment for the locking screw thereof.

9. An electric wiring box as defined in claim 8, wherein said screw stop constitutes means for withstanding thrust from said locking screw by generating a resultant reaction force on said locking screw which is generally parallel to an imaginary plane containing said side plate.

10. An electric wiring box as defined in claim 9, wherein said screw stop comprises a projecting member with a tip and a base flush with said side plate.

11. An electric wiring box as defined in claim 10, wherein said tip comprises a screw engaging surface generally perpendicular to said imaginary plane.

12. An electric wiring box as defined in claim 8, wherein each side plate includes an elongated recess adjacent to the screw stop thereof for receiving a respective locking screw.

13. An electric wiring box as defined in claim 8, wherein said side plates are material selected from the group consisting of metallic material and non-metallic material.

14. An electric wiring box as defined in claim 8, wherein said side plates have a generally rectangular configuration.

* * * * *